United States Patent [19]
Bolza

[11] 3,940,297
[45] Feb. 24, 1976

[54] GELLED EXPLOSIVE COMPOSITION AND PROCESS

[75] Inventor: Frederick Bolza, Victoria, Australia

[73] Assignee: ICI Australia Limited, Melbourne, Australia

[22] Filed: Nov. 5, 1973

[21] Appl. No.: 413,046

[30] Foreign Application Priority Data
Nov. 30, 1972 Australia............................ 1440/72

[52] U.S. Cl. ..................... 149/60; 149/42; 149/43; 149/44; 149/76; 149/83; 149/85
[51] Int. Cl.² .......................................... C06B 31/30
[58] Field of Search ............. 149/44, 42, 60, 43, 76, 149/83, 85

[56] References Cited
UNITED STATES PATENTS
3,717,519    2/1973    Sheeran et al......................... 149/60

*Primary Examiner*—Stephen J. Lechert, Jr.
*Attorney, Agent, or Firm*—Cushman, Darby & Cushman

[57] ABSTRACT

A stable, gelled, water-bearing explosive composition and a process for making same. The composition comprises at least one water-soluble inorganic oxygen releasing salt; at least one fuel; water; and at least one gum selected from the group consisting of galactomannans and xanthans crosslinked in situ with a crosslinking agent comprising a redox system which system comprises at least one arsenious compound.

15 Claims, No Drawings

GELLED EXPLOSIVE COMPOSITION AND PROCESS

This invention relates to a process for gelling aqueous solutions or dispersions of polymeric materials. More particularly this invention relates to a process for making water bearing gels comprising gums such as galactomannans or biopolymeric materials produced by a process comprising the microbial transformation of carbohydrate material and to certain products obtained thereby, including explosives.

Hydrophilic vegetable gums have been articles of commerce for hundreds of years. These natural gums constitute a class of organic substances structurally related to the sugars and carbohydrates. They have the characteristic property of forming viscous colloidal solutions (sols) or mucilages in water, either by dissolving, i.e., dispersing uniformly, in the water or by absorbing many times their own volume of water. A wide range of solution or sol properties can thus be obtained by use of different gums under a variety of conditions. The properties of the hydrophilic gums, especially in solutions, make them extremely valuable in manufacturing processes. Wide applications for the gums have been found in explosives technology, in the textile, cosmetic, pharmaceutical, and food industries, and to a lesser extent, in other industries.

Addition of the gums, even in very low concentrations, to solutions can cause remarkable increases in viscosity, and relatively speaking, a further slight increase in the gum concentration will often give a gel structure. The viscosity-building, or thickening, action of the gums in aqueous systems may be all that is desired at times, whereas in other circumstances, a substantial immobilization of the water-bearing composition by formation of a gel is desired. Gel formation is particularly desirable when undissolved solids are present in a system and must be maintained in a relatively uniform state of dispersion therein, even after removal from the mixer or other dispersing device.

As used herein, a gel is a mixture, one component of which is water, homogeneous down to substantially colloidal dimensions and capable of resisting a finite shearing force. This resistance to shearing is evidence of some sort of continuous mechanical network or structure which, however, can constitute a relatively small fraction of the total mass of the composition of which the gel is a component. Thus, the gel forms a matrix in which both dissolved and undissolved components can be distributed. Simply cooling a gum solution prepared at elevated temperatures, or increasing the concentration of the dissolved or dispersed gum, may lead to gel formation. Such gels, however, often have relatively low practical utility because they are physically weak and tend to rupture and crumble, or because gel formation is reversible with increases in temperature, or because the gel structure collapses in the presence of other components in the mixture, especially in the presence of dissolved electrolytes. Further, the increased concentration of relatively expensive gum which is required to obtain a greater degree of immobility of the aqueous system often imposes a substantial economic penalty on the resulting composition.

Galactomannans constitute one of the industrially important classes of gums, of which locust bean gum and guar gum are the most important members. Other suitable galactomannan gums which may be mentioned include those from the endosperms of seeds of other leguminous plants such as the sennas, brazilwood, tara, honey locust, paloverde, and rattlebox, alfalfa gum, clover gum, and fenugreek gum. In present commerce, however, the most important galactomannan gums are locust bean gum and guar gum. Locust beam gum is milled endosperm of the seeds of the leguminous plant, *Ceratonia siliqua*. It is marketed under a variety of other names, including Carob gum, gum Gatto, gum Hevo, Jandagum, Lakoegum, Rubigum, Iupogum, Luposol, gum Tragon, Trafarab, and Tragasol. Guar gum, on the other hand, generally is identified as such. It is milled endosperm from the seeds of the plant *Cyamopsis tetragonolobus*, also of the family Leguminosa. In addition to these natural gums referred to above certain other synthetic gums suitable for the preparation of water bearing gels have become available recently. From amongst such synthetic gums there may be mentioned the so-called biopolymeric materials or xanthan gums which are produced by a process comprising the microbial transformation of carbohydrate material. These xanthan gums may be prepared for example by reacting a carbohydrate with a microorganism to obtain a polymeric material which differs fundamentally from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Since such carbohydrates need not be in a refined state, many crude products having a high carbohydrate concentration may be utilized. Amongst suitable materials there may be mentioned raw sugar, crude molasses and the like. Microorganisms suitable for effecting the microbial transformation of carbohydrates may be for example plant pathogenic bacteria such as plant pathogens which produce exudates at the site of lesions on infected plants. Typical of such microorganisms are the species of the genus Xanthomonas. Thus for example a heteropolysaccharide may be prepared from glucose by the plant pathogen *Xanthomonas campestris* to give a product comprising D-mannose, D-glucose and D-glucoronic acid as the potassium or sodium salt. Similarly extracellular polysaccharides of a similar structure to the above may be prepared from glucose or sucrose by the plant pathogenic microorganisms *Xanthomonas oryzae* or *Xanthomonas phaseoli*. It is of interest to note that the polysaccharide from *X. oryzae* resembles that from *X. campestris* since both contain combined pyruvic acid. Although the structural significance of the pyruvic acid in these polysaccharides is obscure, it appears to be present as a ketal group, as in the case of red seaweed polysaccharides. Amongst other species of organisms of the genus Xanthomonas from which suitable biopolymers may be prepared there may be mentioned *X. malvacearum; X. translucens f. sp. hordeiavenae; X. translucens f. sp. undulosa; X. carotae; X. hederae; X. papavericola; X. incannae; X. vesicatoria; X. begoniae* and *X. vasculorium*. Biopolymers may also be produced from organisms other than those of the genus Xanthomonas. Thus there may be mentioned amongst the bacterial polysaccharides the dextran produced by *Leuconostoc mesenteroides* and related species, and the glucosan produced by *Agrobacterium tumefaciens*. A biopolymer or xanthan gum typical of those suitable for use as a gellable gum is the material known as "Biopolymer" XB23 (Registered Trade Mark) available commercially from General Mills Inc. of Minneapolis, Minn., U.S.A. This material comprises a biopolymeric material derived from a polymer which has been reacted with $X$. campestris. Another suitable material is the water soluble polymer known as XC polymer available commercially from Esso Production Research Co. of Houston, Tex., U.S.A. This polymer is produced by the action of bacteria of the genus Xanthomonas on carbohydrates to give a biopolymer of a very complex chemical structure. These naturally occurring gums and biopolymeric materials have a high tolerance for dissolved electrolytes and produce high-viscosity systems in water and in salt solutions, but gelation of solutions or sols of such gums occurs only at relatively high concentrations of galactomannan. As a consequence, crosslinking agents are used to hasten the formation of gels, to form gels at relatively low gum concentrations, and to form gels having properties not obtainable by the use of gums alone. Thus it has been proposed to crosslink gums by means of certain oxidizing agents for example sodium dichromate and it has been proposed also to crosslink gums by means of redox systems formed from oxidizer and reducer materials for example sodium dichromate and soluble bismuth or antimony salts. Whilst such systems have been reasonably satisfactory they have suffered from certain deficiencies. Thus in instances wherein a solid phase is present in the system it has been observed that segregation of the solid phase occurs particularly when bismuth salts have been used as part of the crosslinking system. It has also been observed when bismuth salts have been used in a redox system that the rate of gelation is often comparatively slow and thus applications for this type of redox system are comparatively specialized. By contrast when antimony salts are used in a redox crosslinking system the initial rate of gelation is fast and the degree of gelation increases with the passage of time. Whilst this property has been useful for many purposes it suffers from the disadvantage that the water bearing gel becomes intractable and it has been found difficult to pump such gels after they have aged for about a day and this condition has been found to persist on longer storage, for example after ageing for a week.

We have now found that the deficiencies outlined above may be reduced if there is used as a crosslinking agent for gums in water bearing systems compounds derived from arsenic. In view of the chemical similarity of the elements arsenic, antimony and bismuth it is surprising to find that compounds derived from arsenic can provide stable aqueous gels having enhanced and unexpected characteristics when compared with gels prepared in a similar manner from compounds derived from antimony or bismuth.

Accordingly we provide a process for the gelation of gums selected from the group consisting of galactomannans and xanthans which process comprises mixing water, gum and crosslinking agent comprising a redox system which system comprises at least one arsenious compound. By arsenious compound we mean an arsenic-containing compound wherein the valency of the arsenic is 3. From amongst such compounds there may be mentioned as typical examples arsenious chloride, arsenious bromide, arsenious iodide, arsenious sulphide, and arsenious oxide. From amongst such compounds arsenious oxide is preferred since it is readily available at a comparatively low cost.

The amount of the arsenious compound which is used in our process may be varied widely. Useful gels are provided in our process wherein there is present amounts as low as 0.002 millimole of arsenious compound per gram of gum. However the process is usually performed by providing the admixture of arsenious compounds in amounts in the range from 0.01 to 5 millimoles, preferably from 0.05 to 2.5 millimoles, per gram of gum.

The process of our invention as hereinbefore described may be performed in several ways. For example a premix of gum or gums and crosslinking agent or agents may be added to water to cause gelation. In another and preferred embodiment of our invention the gum or gums may be given a hydration treatment prior to admixing the gum component with the crosslinking component. By hydration is meant the association of water molecules with gum molecules that occurs when a gum is uniformly dispersed in an aqueous system. Such hydration, which is accompanied by swelling of the gum should not be confused with the crosslinking that takes place in the instant process.

In a still further embodiment of our invention our crosslinking agents may be predissolved in water and thus may be introduced into the aqueous gelation systems. In cases where the arsenious compounds have relatively low solubility in water, solubility may in some instances be increased advantageously if desired by suitable adjustment of the pH of the aqueous medium.

In redox systems used as crosslinking systems in our process the nature of the oxidizer component of such a system is not narrowly critical and may comprise one or more of known oxidizers. From such oxidizer material there may be mentioned for example chromates such as sodium chromate, potassium chromate, barium chromate, zinc chromate or ammonium chromate, and particularly the dichromates such as sodium dichromate or potassium dichromate. When such a system is used it is preferred that the oxidizer material be added to the reaction mixture subsequent to the incorporation of the arsenious compound in the reaction mixture.

Our processes may be performed in aqueous media which are substantially neutral, i.e., when the pH of the system is about 7 and the process is also effective in acidic or basic aqueous media. Thus for certain systems our process is operable when the pH of the system lies in the range from 3 to 10. For other systems excellent gels may be obtained when the pH of the system is less than 9 say in the range from 4 to 8.

Our process is useful for the preparation of aqueous gelation systems comprising varying amounts of gellable gums. The proportion of such gellable gums in such systems will depend to a large extent on the application for which the system is to be used. Suitable gelation is obtained when the gum component comprises from 0.1 to 5% w/w of the system although systems containing 10% w/w or more of the gum component can be used. However, for most applications satisfactory systems are obtained when the gum component comprises from 0.3 to 3% w/w of such water-bearing gels.

Accordingly we provide as a new composition of matter a water-bearing gel comprising at least one gum selected from the group consisting of galactomannans and xanthans, water and a crosslinking agent comprising a redox system which system comprises at least one arsenious compound. Optionally there may also be present in our composition additional dispersed or dissolved materials.

The gels made by our process in its various embodiments have a low permeability to water and in products wherein there are dispersed or dissolved additional ingredients such gels exhibit enhanced resistance to leaching of such ingredients by aqueous media when compared to similar water bearing gels of the prior art. Furthermore the degree of syneresis exhibited by gels made by our process is negligible. Gels made by our process also show surprisingly differing characteristics on ageing in comparison with gels prepared using cross-linking systems of the prior art. As discussed earlier systems using bismuth salts provide only a slow rate of gelation and when antimony salts are used as crosslinking agents the initial rate of gelation is fast and the degree of gelation increases with the passage of time. By contrast gels made by our process, whilst having a fast initial rate of gelation somewhat similar to the rate obtained with antimony salts, do not exhibit a continuing increase in gelation with time. We have observed that certain gels made by our process reach a peak of gelation and then within a few days the degree of gelation declines until it reaches a comparatively steady value to provide a product the viscosity of which is somewhat similar to the viscosity of a hydrated uncrosslinked gum of similar concentration. Despite this unexpected change in gelation characteristics as measured by viscometry the characteristics of waterproofness and resistance to leaching of ingredients by water are not unduly impaired. This unpredictable characteristic is of considerable utility in instances where it is desired to pump or pour a product made by our process from a container a few days after it has been prepared. The gelation characteristics of the gels made by our process may be controlled as desired by a suitable choice of the ratio of the amount of arsenious compound to the amount of oxidizer component in the redox system used in the process. For example when a redox system comprising arsenious oxide and sodium dichromate is used in our process it has been found that the final gel so obtained becomes softer and more pourable or pumpable as the ratio of arsenious oxide to sodium dichromate becomes greater. Thus gels which are formed using a particular proportion of arsenious oxide in the composition and wherein the above ratio is say 10 : 1 when expressed on a weight basis are softer and more easily pumpable then those wherein the above ratio is say 5 : 1 and the degree of softness and the ease whereby the gels may be poured decreases as the above ratio decreases say to 1 : 5 or 1 : 10. Particularly useful gels are obtained when the above ratio is greater than 1 : 1 for example in the range from 2 : 1 to 4 : 1.

The process of our invention and the products obtained thereby are useful in a diversity of applications. Thus when the reaction mixture contains only the aforementioned gums, water and crosslinking agent the process is useful in the sizing of papers and for the preparation of drilling muds. As mentioned earlier the reaction mixture may also contain other dispersed or dissolved ingredients. Thus the process of our invention is particularly suitable for making explosive compositions such as gelled aqueous blasting agents.

In general, aqueous blasting agents prepared in accordance with this invention may be described as stable, gelled water-bearing explosive compositions comprising at least one water soluble inorganic oxygen releasing salt; water; at least one fuel; at least one gum selected from the group consisting of galactomannans and xanthans; and crosslinking agent comprising a redox system which system comprises at least one arsenious compound.

In general, except for the gel matrix, such water-bearing explosives are of conventional types. The oxygen releasing salts suitable for use in explosive compositions made by our process are of the conventional types used in explosive compositions. Thus they may be, for example, inorganic nitrates, chlorates and perchlorates and mixtures thereof. We prefer that the oxygen releasing salt material be chosen from the nitrates of the alkali and alkaline earth metals or ammonium and of these we prefer sodium nitrate and ammonium nitrate. The amount of oxygen releasing salt in such compositions is not narrowly critical; we have found that compositions containing amounts of oxygen releasing salts from 50% w/w to 90% w/w of the total composition are satisfactory and amounts from 65% w/w to 85% w/w are preferred. The particle size and shape of the oxygen releasing salt is not critical and is well known from the art of ammonium nitrate manufacture; powders and prilled particles are satisfactory.

The proportion of water in such compositions should be sufficient to dissolve at least part of the oxygen releasing inorganic salt and at least part of any water soluble fuel which may be present, and also be sufficient to hydrate at least part, preferably all, of the gelling agent present. Suitably the amount of water present may constitute from 5% w/w to 35% w/w of the total composition, but the amount present should not be in excess of the explosive limit of the composition. We prefer that the water be in the range from 5% w/w to 25% w/w of the total composition and more preferably be in the range from 12% w/w to 17% w/w of the total composition.

When referring to fuels or fuel materials in this specification we mean substances which are stable in such explosive compositions, that is prior to detonation, during preparation and storage the substance is chemically inert to the system. The said substances must be combustible and their physical nature should be such that they may be incorporated in our compositions in a manner so as to be uniformly distributed throughout the compositions. Such fuels are well known in the art and they may be organic or inorganic and may also be derived from animals and plants.

The fuels employed in the compositions prepared by the process of this invention can be, for example, self-explosive fuels, non-explosive carbonaceous, non-metallic and metallic fuels or mixtures of the aforementioned types of fuels. They can be varied widely. Examples of self-explosive fuels include one or more organic nitrates, nitrocompounds and nitramines such as trinitrotoluene, cyclotri (or tetra) methylenetri (or tetra) nitramine, tetryl, pentaerythritol tetranitrate, explosive grade nitrocellulose and nitro-starch.

The self-explosive fuel can be for example in any of the well known flake, crystalline or pelleted forms. In general up to 35% and preferably from 10 to 30% by weight based on the weight of composition of self-explosive fuel may be used.

Suitable water soluble fuels are organic water soluble substances for example urea, carbohydrates such as sugars or molasses, water soluble alcohols or glycols, glues or mixtures of these. Suitably the proportion of water soluble fuel in our compositions is in the range from 0.8% w/w to 8% w/w of the total composition. Amounts from 4% w/w to 7% w/w of the total composition are preferred.

Suitable water insoluble or sparingly water soluble fuels may be chosen from inorganic materials for example sulphur, aluminium, silicon, ferrosilicon, ferrophosphorus, magnesium, titanium, boron, mixtures thereof for example mixtures of aluminium with ferrosilicon, or organic materials for example finely divided charcoal, anthracite, gilsonite, asphalt, fuel oil, cellulosic materials such as sawdust, or cereal products for example flours, dextrins or starches. When the inorganic fuel is a metal it is preferably in granulated or powdered form ranging in particle size from coarse, for example retained on a 30 mesh sieve, to very fine for example passing a 325 mesh sieve. Such granulated or powdered metal may be in the form of discrete regular shaped particles, but metal powders wherein the metal is in the form of irregular shaped particles, or in flakes or in the form of aggregates of particles or flakes are also satisfactory. Preferred fuels are the metallic powders. The most preferred metallic fuel is aluminium. The proportion of water insoluble or sparingly water soluble non-metallic fuels in such compositions may suitably be in the range from 1% w/w to 10% w/w of the total composition and amounts from 4% w/w to 7% w/w of the total composition are preferred. The proportion of metallic water insoluble fuels when present in such compositions may be as high as 25% w/w and amounts in the range from 0.5% w/w to 20% w/w of the total compositions are preferred.

Where desirable, it is convenient to add to the slurry explosive compositions made according to the process of our invention, in amounts expressed as parts by weight per 100 parts by weight of the final mixture, other conventional additives used in slurry explosives. Such additives may include for example anti-foaming agents, for example ethyl hexanol, in amounts ranging e.g. from 0 to 0.1 part, surfactants, for example non-ionic surfactants such as alkylene oxide condensates of phenols or amides, from 0 to 5 parts. When desired, sensitizers in the form of gas or a mixture of gases such as air may be added to our compositions. Thus it may be added in the form of injected or stirred in air or gas or it may be added as air or gas encapsulated in or attached to the surface of particulate material. Alternatively a gas, such as nitrogen or carbon dioxide, may if desired be generated in the composition by known means. Yet again further sensitizers in the form of modified metallic powders may be added to the explosive compositions prepared by our process. Such modified metallic powders include for example the reaction product of aluminium powder with resin acids, rosin and derivatives thereof. It has also been observed that explosives compositions prepared by the process of our invention may in some instances be provided with enhanced water resistance properties and that the rate of gelation is increased if there is added to the reaction mixture an amount of a pH controlling agent such that the pH of the composition is in the range from 4 to 8, preferably not in excess of 7. From amongst suitable pH controlling agents there may be mentioned alkali metal salts such as sodium hydroxide or acids such as hydrochloric acid.

In general, the explosive compositions of this invention may be prepared by the conventional formulating techniques used for preparing galactomannan or xanthan containing aqueous explosives excepting, or course, that the aforementioned arsenious compounds are used as components of the crosslinking agents. Thus, for example, in explosive compositions the concentration of the aforementioned arsenious compound may be as low as 0.002 millimole per gram of gum. Preferably the concentration of the arsenious compound in such explosives compositions will provide from 0.01 to 5 millimoles, more particularly from 0.05 to 2.5 millimoles, of arsenious compound per gram of gum. The proportion of gum component in the explosives composition is conveniently in the range from 0.1 to 5% w/w of the composition. Where a galactomannan, for example guar gum, is used amounts in the range from 0.2 to 3% w/w of the composition are particularly convenient.

Considered as freshly made products the blasting compositions made by this process do not differ appreciably in explosive properties from similar compositions of the prior art. However the unique characteristics of the compositions so obtained in respect of the reduction in their viscosity after ageing make them particularly suitable for use as pumpable or pourable explosive slurries. Thus they may be transported from a manufacturing site in the form of a packaged explosive slurry having a relatively high viscosity and after ageing may be pumped or poured into a borehole. Additionally the compositions obtained by the process of this invention are markedly superior to prior art compositions in resistance to degradation during storage, and in resistance to leaching of the components when the compositions are in contact with aqueous media, for example when in contact with water in a borehole when used in processes of blasting and have thus enabled improvements to be made in blasting processes. By means of the use of explosive compositions prepared by the process of our invention it is now possible to perform blasting operations in areas where hitherto, because of the presence of water in such areas, it has been difficult to detonate explosive compositions of a similar type.

Our invention is now illustrated by, but by no way limited to, the following examples wherein all parts and percentages are expressed on a weight basis unless otherwise specified. Examples 5 and 7 are included for the purposes of comparison and are not within our invention.

EXAMPLE 1

To 9440 parts of water at room temperature and maintained in a state of vigorous agitation there was added 60 parts of guar gum. The agitation was continued until the gum was uniformly dispersed and hydrated and no lumps and aggregates were present. To the resulting dispersion there was added with stirring 400 parts of a solution which has been prepared by adding and admixing 10 parts of arsenious oxide ($As_2O_3$) with 100 parts of aqueous 0.1 M sodium hydroxide solution neutralizing the mixture with nitric acid and adjusting the volume to 400 parts by the addition of water. To the mixture there was then added with stirring 100 parts of a 5% aqueous solution of sodium dichromate whereupon the mixture was converted rapidly to a water bearing gel.

EXAMPLE 2

To 100 parts of 0.1 M sodium hydroxide aqueous solution there was added 10 parts of arsenious oxide. The mixture was then neutralized with a small amount of nitric acid and adjusted to a volume of 400 parts by the addition of water. There was then added with stirring a further 9380 parts of water and to the resultant mixture there was added 120 parts of locust bean gum. Stirring was continued until the gum was hydrated and uniformly dispersed whereupon there was added with stirring 100 parts of a 5% aqueous solution of potassium dichromate. The mixture was converted rapidly to a water bearing gel.

EXAMPLE 3

The general procedure of Example 2 was repeated but the locust bean gum of that Example was replaced by 30 parts of "Biopolymer" XB 23. A water bearing gel was thus obtained.

EXAMPLE 4

A gelled blasting agent composition was prepared from the following components:

| | |
|---|---|
| Ammonium nitrate | 673 parts |
| Sodium nitrate | 30 parts |
| Aluminium powder | 100 parts |
| Guar gum | 6 parts |
| Sugar | 50 parts |
| Water | 140 parts |
| Arsenious oxide | 0.5 part |
| Sodium dichromate | 0.25 part |

A dry premix of the ammonium nitrate, sodium nitrate, aluminium powder and guar gum was prepared. To this premix there was added the sugar dissolved in 110 parts of water. The resultant mixture was agitated and admixed to a uniform mass during which time the guar gum became hydrated. The arsenious oxide was added to 25 parts of warm water and stirred uniformly into the mixture. The sodium dichromate was then dissolved in the residual water and added to the mixture with stirring to form a gelled slurry explosive composition which was stored over a period of 13 weeks. It was observed over this time that the composition, which was in the form of a stiff gel soon after manufacture had changed to a pumpable or pourable composition. Despite this change in apparent viscosity no segregation of the components was observed and the resistance to leaching by water of the soluble components was considerably better after 13 weeks storage than after 1 day of storage. The resistance to leaching by water of the soluble components from the composition was tested by the following procedure. An amount of the composition which had gelled for 24 hours and containing 10 gram of ammonium nitrate, in this instance approximately 14.9 gm, was placed in a mesh basket and suspended in 200 ml of water at room temperature. After 75 minutes the basket and its residual content was removed from the aqueous medium. The aqueous medium was then stirred until it was homogeneous and a 50 ml aliquot taken therefrom was analysed for its ammonium nitrate content. The above procedure was repeated with the gel after gelation had proceeded for each of 1 week, 2 weeks, 3 weeks and 13 weeks. The percentage of the ammonium nitrate retained in the treated composition, based on the original ammonium nitrate content, was as follows:

| | |
|---|---|
| After 24 hours gelation | 27% |
| After 1 week gelation | 44% |
| After 2 weeks gelation | 45% |
| After 3 weeks gelation | 48% |
| After 13 weeks gelation | 47% |

EXAMPLE 5

For the purposes of comparison the general procedure of Example 4 was repeated but the arsenious oxide of that Example was replaced by 1 part of bismuth nitrate [$\overline{Bi(NO_3)_2 5H_2O}$]. The explosive composition was in the form of a weak gel and segregation of water insoluble material in the composition was observed. When tested for resistance to leaching by water the percentage of ammonium nitrate retained in this comparative composition was 5% after 24 hours gelation, 13% after one week of gelation and 11% after 2 weeks of gelation.

EXAMPLE 6

This example demonstrates the apparent viscosity characteristics of a water bearing gel prepared according to the process of our invention. To a mixture of 6000 parts of ammonium nitrate, 4000 parts of water and 5 parts of arsenious oxide there was added 100 parts of guar gum and the mixture was stirred for 3½ hours to provide a dispersion of hydrated gum. The viscosity of this dispersion was determined by means of a Brookfield viscometer at intervals during this period and the results obtained are set out in Table I. To this mixture there was then added with stirring 2.5 parts of sodium dichromate dissolved in 50 ml of water. The mixture was converted to a gel and the viscosity of the gel was measured at the time intervals set out in Table I.

EXAMPLE 7

For the purposes of comparison the general procedure of Example 6 was repeated except that the arsenious oxide of that Example was replaced by 5 parts of potassium antimony tartrate. The results obtained in the viscosity determination are set out in Table I.

TABLE I

| VISCOSITY EXPRESSED IN POISE | | | |
|---|---|---|---|
| Elapsed time (hours & minutes) | | Example 6 | Example 7 (comparative) |
| 0 hr | 3 mins | 29 | 25 |
| 1 hr | 30 mins | 74 | 64 |
| 3 hr | 30 mins | 73 | 71 |
| 3 hr | 31 mins | 700 | 106 |
| 3 hr | 32 mins | 900 | 352 |
| 3 hr | 33 mins | 1200 | 396 |
| 3 hr | 35 mins | 1200 | 640 |
| 16 hr | 10 mins | 480 | 800 |
| 72 hr | | 85 | 1000 |
| 96 hr | | — | 1300 |
| 144 hr | | 78 | 1600 |
| 192 hr | | 78 | 1600 |
| 216 hr | | 75 | 1500 |
| 336 hr | | 77 | 1500 |

EXAMPLE 8

A dispersion was prepared wherein 4 parts of guar gum were hydrated in a mixture of ammonium nitrate 600 parts, sodium nitrate 130 parts, water 136 parts, sugar 50 parts, sulphur 30 parts, aluminium 70 parts, gilsonite 20 parts and arsenious oxide 0.3 part. A solution was prepared by dissolving 1 part of sodium dichromate in 9 parts of water. Using the apparatus described in Examples 1 and 3 of Belgian Pat. No. 778210 and the method of Example 4 of the same patent the dispersion was pumped at the rate of 70 lb/minute through a loading hose to an attached interfacial surface generator mixer. The sodium dichromate solution was pumped at a rate of 150 ml/minute and injected into the dispersion just before the latter passed out of the loading hose and through the interfacial surface generator mixer. The explosive composition so formed was thus located in a borehole in the form of a stiff cohesive gel which was detonated successfully 4 hours later.

EXAMPLE 9

The general procedure of Example 8 was repeated except that instead of loading the explosive composition to a borehole, the composition was fed into polyethylene containers capable of holding about 60 pounds of explosive. Afer filling the containers with the gelled explosive they were transported in a closed condition to a blasting site and stored for six days during which time they were transformed from a stiff gel to a composition which flowed from the containers when a slit was made in them. The composition was poured in this fluid state into a borehole and detonated successfully.

EXAMPLE 10

The general procedure of Example 1 was repeated except that the amount of arsenious oxide in the present example was increased to 25 parts. The water bearing gel so obtained was somewhat softer than the gel obtained in Example 1.

EXAMPLE 11

200 lb of an explosive composition containing 552 parts of ammonium nitrate, 130 parts of sodium nitrate, 140 parts of water, 40 parts of sugar, 120 parts of atomized aluminum powder available from Alcoa of Australia Ltd. under the designation "Aluminium Powder No. 125," 10 parts of aluminum powder the bulk of which was capable of passing through a 325 mesh sieve and available from Alcoa of Australia Ltd. under the designation "Aluminium Powder No. 408," 6 parts of guar gum, 2 parts of arsenious oxide and 1 part of potassium dichromate was prepared by the method generally described in Example 4 using a conventional mixing device for the preparation of gelled explosives and resembling a concrete mixer. The resultant highly viscous gelled mixture which had a pH of 6 was transferred to a container fitted with a pumping means and stored therein for two weeks. At the end of this period, the viscosity of the explosive had become lower and the product was sufficiently mobile to enable it to be pumped to a borehole in which it was detonated successfully.

EXAMPLE 12

The general procedure of Example 1 was repeated except that the arsenious oxide of that example was replaced by 10 parts of arsenious chloride. The product so obtained was similar to that obtained in Example 1.

EXAMPLE 13

The general procedure of Example 1 was repeated but in the present example the amount of arsenious oxide used was 0.5 part and the amount of sodium dichromate solution used was 25 parts. There was thus obtained a product which was more lightly gelled than was the product of Example 1 but the gel was sufficiently firm to prevent segregation of the guar gum.

EXAMPLE 14

The general procedure of Example 1 was repeated but in the present example the amount of arsenious oxide used was 55 parts and the amount of sodium dichromate solution used was 400 parts. There was thus obtained a water bearing gel which was pourable after being stored for one week.

EXAMPLE 15

The general procedure of Example 1 was repeated but the sodium dichromate solution of that Example was replaced by a 5% aqueous solution of sodium chromate. A water bearing gel was thus obtained.

EXAMPLE 16

Using the general procedure of Example 4 a gelled blasting agent composition was prepared from the following components:

| | |
|---|---|
| Ammonium nitrate prills | 300 parts |
| Ammonium nitrate powder | 292 parts |
| Sodium nitrate | 120 parts |
| Sugar | 40 parts |
| Water | 125 parts |
| Ethylene glycol | 9 parts |
| Gilsonite | 8 parts |
| Aluminium powder * | 90 parts |
| Aluminium powder No. 408 | 10 parts |
| Guar gum | 4.5 parts |
| Arsenious oxide | 0.5 part |
| Sodium dichromate | 0.2 part |

* The bulk of this powder was capable of passing through a 200 mesh sieve.

The resultant product was stored for one week at ambient temperature and a portion thereof was then pumped from the storage container by means of a pneumatic pump operating at a pressure of 51 pounds per square inch gauge through a hose having an internal diameter of 1 inch and a length of 21 feet. The composition was pumped through the hose at a rate of 78 pounds per minute. This composition, in the form of a paper wrapped cartridge having a diameter of 1 inch was exploded successfully using a No. 6 copper detonator. The remainder of the composition was stored for a further 3 weeks and after this time its resistance to leaching by water was determined by the method set out in Example 4. The percentage of the ammonium nitrate retained in the treated composition after 4 weeks of storage was 40%. The composition which had been stored for 4 weeks was pumped through a hose in a manner similar to that described above and the resistance to leaching by water of this pumped composition was determined. The percentage of the ammonium nitrate retained in this treated pumped composition was 50%. For the purposes of comparison an uncrosslinked composition similar to that described above but wherein the arsenious oxide and sodium dichromate were omitted was stored for one week and was capable of being pumped under the same conditions at a rate of 85 pounds per minute. In a further comparison a composition similar to that described above but wherein the arsenious oxide had been replaced by 0.5 part of potassium antimony tartrate could not be pumped through the hose under the conditions described above after this comparative composition had been stored for one week.

EXAMPLE 17

The general procedure of Example 2 was repeated but the locust bean gum of that example was replaced by a mixture of gums consisting of 95 parts of guar gum and 25 parts of locust bean gum. A water bearing gel was thus obtained.

EXAMPLE 18

The general procedure of Example 1 was repeated but the amount of guar gum used was reduced to 20 parts. A water bearing gel was thus obtained.

EXAMPLE 19

To 8000 parts of water at room temperature and maintained in a state of vigorous agitation there was added 300 parts of guar gum. The agitation was continued until there was obtained a mixture wherein the gum was uniformly dispersed and hydrated. 50 parts of arsenious oxide was added to 1000 parts of hot water and stirred uniformly into the mixture. 15 parts of sodium dichromate dissolved in 100 parts of water was then added with stirring and there was thus obtained a water bearing gel.

EXAMPLE 20

The general procedure of Example 3 was repeated but after hydration of the gum and prior to the addition of the sodium dichromate the pH of the mixture was adjusted to a value of 3.2 by addition thereto of an aqueous solution of hydrochloric acid. The water bearing gel so obtained was similar to that obtained in Example 3. Satisfactory gels were also obtained when the pH was adjusted to a value of 4.3 by addition of hydrochloric acid, and at pH values of 7.9 and 9.3 made by the similar addition of an aqueous solution of sodium hydroxide to the mixture.

EXAMPLE 21

The general procedure of Example 4 was repeated, but in the present example the amounts of arsenious oxide and sodium dichromate were varied as set out in Table 2. The resistance to leaching by water after periods of storage of the compositions so obtained is also set out in Table 2.

TABLE 2

| Arsenious Oxide parts | Sodium Dichromate parts | % Ammonium nitrate retained after storage for | | |
|---|---|---|---|---|
| | | 24 hours | 1 week | 2 weeks |
| 0.1 | 0.5 | 20 | 28 | 27 |
| 0.2 | 0.5 | 20 | 30 | 22 |
| 0.3 | 0.5 | 19 | 28 | 31 |
| 0.8 | 0.25 | 28 | 43 | 44 |
| 1.2 | 0.25 | 26 | 40 | 41 |

I claim:

1. In the process for gelling water-bearing explosive compositions containing gum selected from the group consisting of galactomannans and xanthans with cross-linking agents in situ, the improvement which comprises incorporating in the reaction mixture a crosslinking agent comprising a redox system which system comprises at least one arsenious compound present in an amount from 0.01 to 5 millimoles per gram of said gum said gelation being conducted at a pH of from 4 to 8.

2. A process according to claim 1 wherein said arsenious compound is present in an amount from 0.05 to 2.5 millimoles per gram of said gum.

3. A process according to claim 1 wherein said arsenious compound is arsenious oxide.

4. A process according to claim 1 wherein said crosslinking agent is characterized further in that the weight ratio of the said arsenious compound to the oxidizer component of the said redox system is in the range from 5 : 1 to 1 : 5.

5. A process according to claim 4 wherein said ratio is in the range from 2 : 1 to 4 : 1.

6. A process according to claim 1 wherein said gum is selected from the group consisting of guar gum, locust bean gum and a biopolymeric material which has been derived from a polymer which has been reacted with *Xanthomonas campestris*.

7. A stable, gelled, water-bearing explosive composition comprising at least one water-soluble inorganic oxygen releasing salt; at least one fuel; from 5 to 35% by weight of water; and from 0.1 to 5% by weight of at least one gum selected from the group consisting of galactomannans and xanthans crosslinked in situ at a pH from 4 to 8 with a crosslinking agent comprising a redox system which system comprises at least one arsenious compound present in an amount from 0.01 to 5 millimoles per gram of said gum.

8. A stable, gelled, water bearing explosive composition comprising firstly at least one oxygen releasing salt selected from the group consisting of ammonium nitrate, chlorate and perchlorate, alkali metal nitrates, chlorates and perchlorates, and alkaline earth metal nitrates, chlorates and perchlorates present in an amount from 50 to 90 parts; secondly water present in an amount from 5 to 25 parts; thirdly at least one fuel material selected from the group consisting of water soluble fuel present in an amount from 0.8 to 8 parts, non-metallic sparingly water soluble fuel and non-metallic water insoluble fuel present in an amount from 1 to 10 parts and metallic water insoluble fuel present in an amount from 0.5 to 20 parts; fourthly from 0.1 to 5 parts of at least one gum selected from the group consisting of galactomannans and xanthans crosslinked in situ at a pH from 4 to 8 with a crosslinking agent comprising a redox system which system comprises at least one arsenious compound present in an amount from 0.01 to 5 millimoles per gram of said gum, all parts being in parts by weight per 100 parts by weight of the composition.

9. A composition according to claim 8 wherein the oxygen releasing salt is selected from the group consisting of ammonium nitrate and sodium nitrate.

10. A composition according to claim 8 wherein the oxygen releasing salt constitutes from 65% to 85% by weight of the composition.

11. A composition according to claim 8 wherein water constitutes from 12 to 17% by weight of the composition.

12. A composition according to claim 8 wherein said gum is guar gum present in an amount from 0.2% to 3% w/w of the composition and wherein said arsenious compound is arsenious oxide present in an amount from 0.05 to 2.5 millimoles per gram of said gum.

13. A process as in claim 1 wherein said arsenious compound is selected from the group consisting of arsenious chloride, arsenious bromide, arsenious iodide, arsenious sulphide, and arsenious oxide.

14. A process as in claim 7 wherein said arsenious compound is selected from the group consisting of arsenious chloride, arsenious bromide, arsenious iodide, arsenious sulphide, and arsenious oxide.

15. A process as in claim 8 wherein said arsenious compound is selected from the group consisting of arsenious chloride, arsenious bromide, arsenious iodide, arsenious sulphide, and arsenious oxide.

* * * * *